United States Patent
Chin

(10) Patent No.: US 8,265,141 B2
(45) Date of Patent: Sep. 11, 2012

(54) SYSTEM AND METHOD FOR OPEN LOOP SPATIAL PREDICTION IN A VIDEO ENCODER

(75) Inventor: Douglas Chin, Haverhill, MA (US)

(73) Assignee: Broadcom Corporation, Irvine, CA (US)

(*) Notice: Subject to any disclaimer, the term of this patent is extended or adjusted under 35 U.S.C. 154(b) by 1459 days.

(21) Appl. No.: 11/434,968

(22) Filed: May 16, 2006

(65) Prior Publication Data

US 2007/0071092 A1 Mar. 29, 2007

Related U.S. Application Data

(60) Provisional application No. 60/681,642, filed on May 17, 2005.

(51) Int. Cl.
*H04N 7/12* (2006.01)
*H04B 1/66* (2006.01)

(52) U.S. Cl. ......... 375/240.03; 375/240.24; 375/240.05

(58) Field of Classification Search .............. 375/240.03
See application file for complete search history.

(56) References Cited

U.S. PATENT DOCUMENTS

| 5,841,477 | A | * | 11/1998 | Kim | 375/240.24 |
| 5,847,766 | A | * | 12/1998 | Peak | 375/240.24 |
| 5,933,194 | A | * | 8/1999 | Kim et al. | 348/403.1 |
| 6,023,296 | A | * | 2/2000 | Lee et al. | 375/240.05 |
| 2004/0120594 | A1 | * | 6/2004 | Vitali et al. | 382/251 |

* cited by examiner

*Primary Examiner* — Joseph Ustaris
*Assistant Examiner* — Anner Holder
(74) *Attorney, Agent, or Firm* — Brinks Hofer Gilson & Lione

(57) ABSTRACT

Presented herein are systems, methods, and apparatus for real-time high definition television encoding. In one embodiment, there is a method for encoding video data. The method comprises downscaling at least one original reference picture; classifying the content of the macroblocks of the picture; and selecting a spatial prediction mode for each of the macroblocks of the picture based on the content classification. If it is determined that a macroblock is to be coded using spatial encoding, the macroblock is coded using the associated prediction mode.

20 Claims, 7 Drawing Sheets

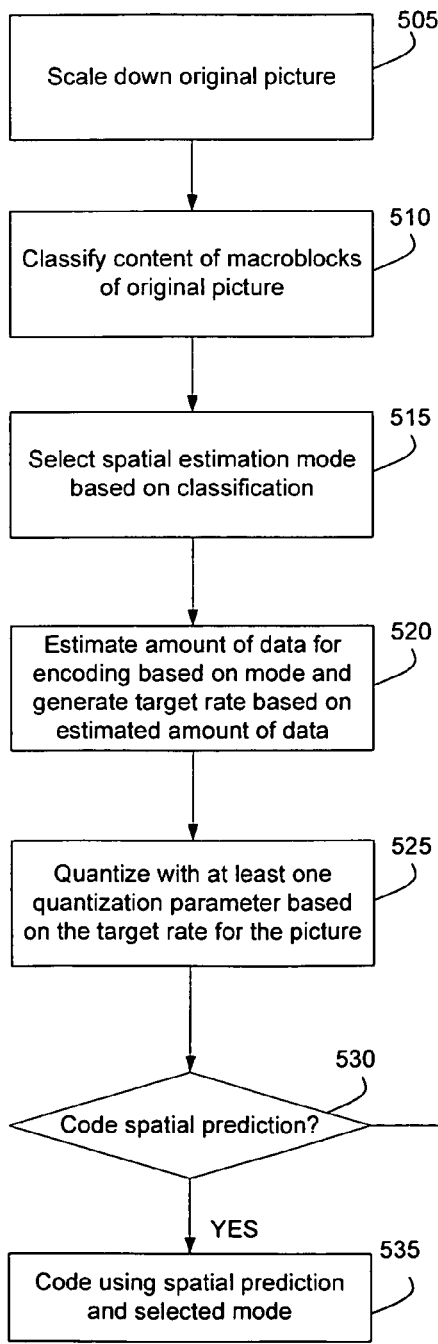
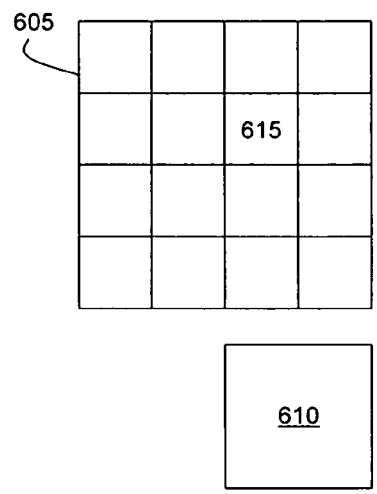
Fig. 6
Fig. 5 a# SYSTEM AND METHOD FOR OPEN LOOP SPATIAL PREDICTION IN A VIDEO ENCODER

RELATED APPLICATIONS

This application claims priority to Provisional Application Ser. No. 60/681,642, "System and Method for Open Loop Spatial Prediction in a Video Encoder", filed May 17, 2005, which is incorporated herein by reference for all purposes.

The above stated applications are hereby incorporated herein by reference in their entirety:

FEDERALLY SPONSORED RESEARCH OR DEVELOPMENT

[Not Applicable]

MICROFICHE/COPYRIGHT REFERENCE

[Not Applicable]

BACKGROUND OF THE INVENTION

Advanced Video Coding (AVC) (also referred to as H.264 and MPEG-4, Part 10) can be used to compress video content for transmission and storage, thereby saving bandwidth and memory. However, encoding in accordance with AVC can be computationally intense.

In certain applications, for example, live broadcasts, it is desirable to compress high definition television content in accordance with AVC in real time. However, the computationally intense nature of AVC operations in real time may exhaust the processing capabilities of certain processors. Parallel processing may be used to achieve real time AVC encoding, where the AVC operations are divided and distributed to multiple instances of hardware, which perform the distributed AVC operations, simultaneously.

Ideally, the throughput can be multiplied by the number of instances of the hardware. However, in cases where a an operation is dependent on the results of a another operation, the operation may not be executable simultaneously with the other operation. In contrast, the performance of the operation may have to wait for completion of the other operation.

AVC uses temporal coding to compress video data. Temporal coding divides a picture into blocks and encodes the blocks using similar blocks from other pictures, known as reference pictures. To achieve the foregoing, the encoder searches the reference picture for a similar block. This is known as motion estimation. At the decoder, the block is reconstructed from the reference picture. However, the decoder uses a reconstructed reference picture. The reconstructed reference picture is different, albeit only slightly, from the original reference picture. Therefore, the encoder uses encoded and reconstructed reference pictures for motion estimation.

Using encoded and reconstructed reference pictures for motion estimation causes encoding of a picture to be dependent on the encoding of the reference pictures. This can be disadvantageous for parallel processing.

Further limitations and disadvantages of conventional and traditional approaches will become apparent to one of skill in the art, through comparison of such systems with some aspects of the present invention as set forth in the remainder of the present application with reference to the drawings.

BRIEF SUMMARY OF THE INVENTION

A system and/or method for encoding video data in real time, substantially as shown in and/or described in connection with at least one of the figures, as set forth more completely in the claims These and other features and advantages of the present invention may be appreciated from a review of the following detailed description of the present invention, along with the accompanying figures in which like reference numerals refer to like parts throughout.

BRIEF DESCRIPTION OF SEVERAL VIEWS OF THE DRAWINGS

FIG. 5 is a flow diagram for performing spatial prediction for encoding pictures, in accordance with an embodiment of the present invention;

FIG. 6 is a block diagram describing spatial estimation for encoding pictures, in accordance with an embodiment of the present invention;

DETAILED DESCRIPTION OF THE INVENTION

Figure 1:
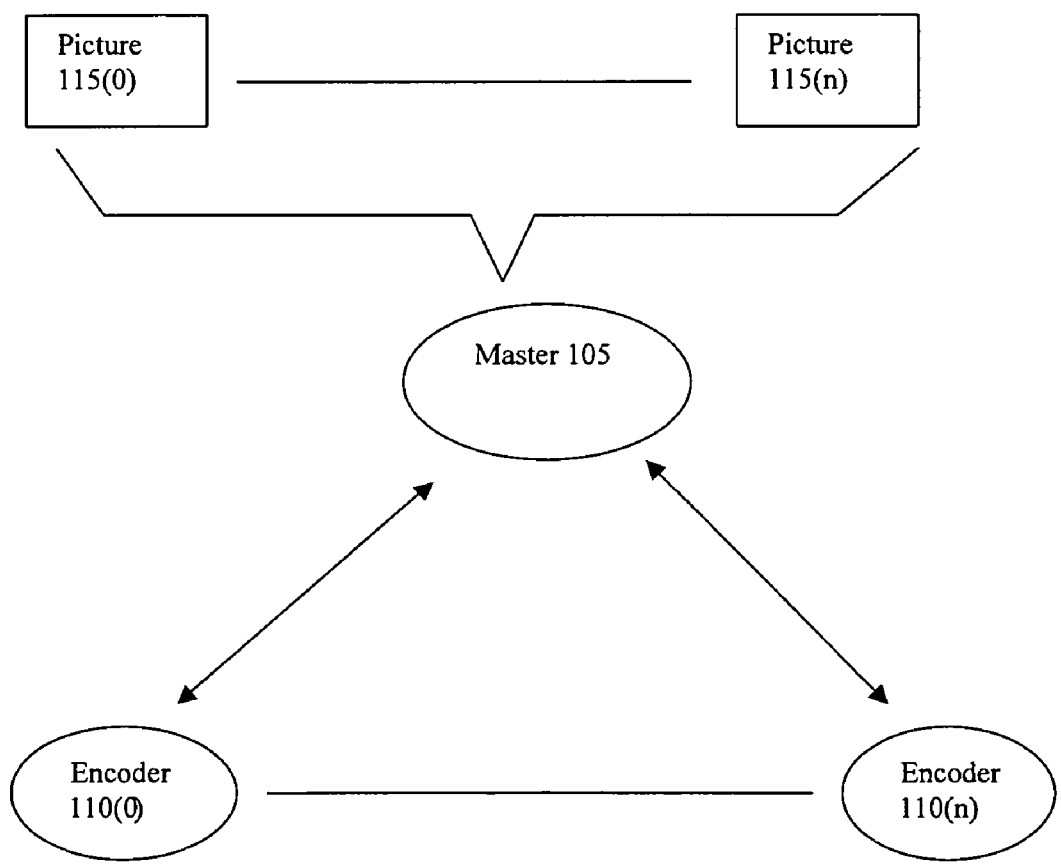
FIG. 1 is a block diagram of an exemplary system for encoding video data in accordance with an embodiment of the present invention.

Referring now to FIG. 1, there is illustrated a block diagram of an exemplary system 100 for encoding video data in accordance with an embodiment of the present invention. The video data comprises a plurality of pictures 115(0) ... 115(n). The system comprises a plurality of encoders 110(0) ... 110(n). The plurality of encoders 110(0) ... 110(n) estimate amounts of data for encoding a corresponding plurality of pictures 115(0) ... 115(n), in parallel. A master 105 generates a plurality of target rates corresponding to the pictures and the encoders. The encoders 110(0) ... 110(n) lossy compress the pictures based on the corresponding target rates.

The master 105 can receive the video data for compression. Where the master 105 receives the video data for compression, the master 105 can divide the video data among the encoders 110(0) ... 110(n), provide the divided portions of the video data to the different encoders, and play a role in controlling the rate of compression.

In certain embodiments, the compressed pictures are returned to the master 105. The master 105 collates the compressed pictures, and either writes the compressed video data to a memory (such as a Hard Disk) or transmits the compressed video data over a communication channel.

The master 105 plays a role in controlling the rate of compression by each of the encoders 110(0) ... 110(n). Compression standards, such as AVC, MPEG-2, and VC-1 use a combination of lossless and lossy techniques to compress video data. In the lossless compression techniques, information from the video data is not lost from the compression. However, in lossy compression, some information from the video data is lost to improve compression. An example of lossy compression is quantization.

Lossy compression involves trade-off between quality and compression. Generally, the more information that is lost during lossy compression, the better the compression rate, but, the more the likelihood that the information loss perceptually changes the video data 102 and reduces quality.

The encoders 110 perform pre-encoding estimations of the amount of data for encoding pictures 115. For example, the encoders 110 can generate normalized estimates of the amount of data for encoding the pictures 115, by estimating the amount of data for encoding the pictures 115 with a given quantization parameter.

Based on the estimates of the amount of data for encoding the pictures 115, the master 105 can provide a target rate to the encoders 110 for compressing the pictures 115. The encoders 110(0) . . . 110(n) can adjust certain parameters that control lossy compression to achieve an encoding rate that is close, if not equal, to the target rate.

The estimate of the amount of data for encoding a picture 115 can be based on a variety of factors. These qualities can include, for example, content sensitivity, measures of complexity of the pictures and/or the blocks therein, and the similarity of blocks in the pictures to candidate blocks in reference pictures. Content sensitivity measures the likelihood that information loss is perceivable, based on the content of the video data. For example, in video data, human faces are likely to be more closely examined than certain textures.

In certain embodiments of the present invention, the master 105 can also collect statistics of past target rates and actual rates under certain circumstances. This information can be used as feedback to bias future target rates. For example, where the actual target rates have been consistently exceeded by the actual rates in the past under a certain circumstance, the target rate can be reduced in the future under the same circumstances.

Figure 2:
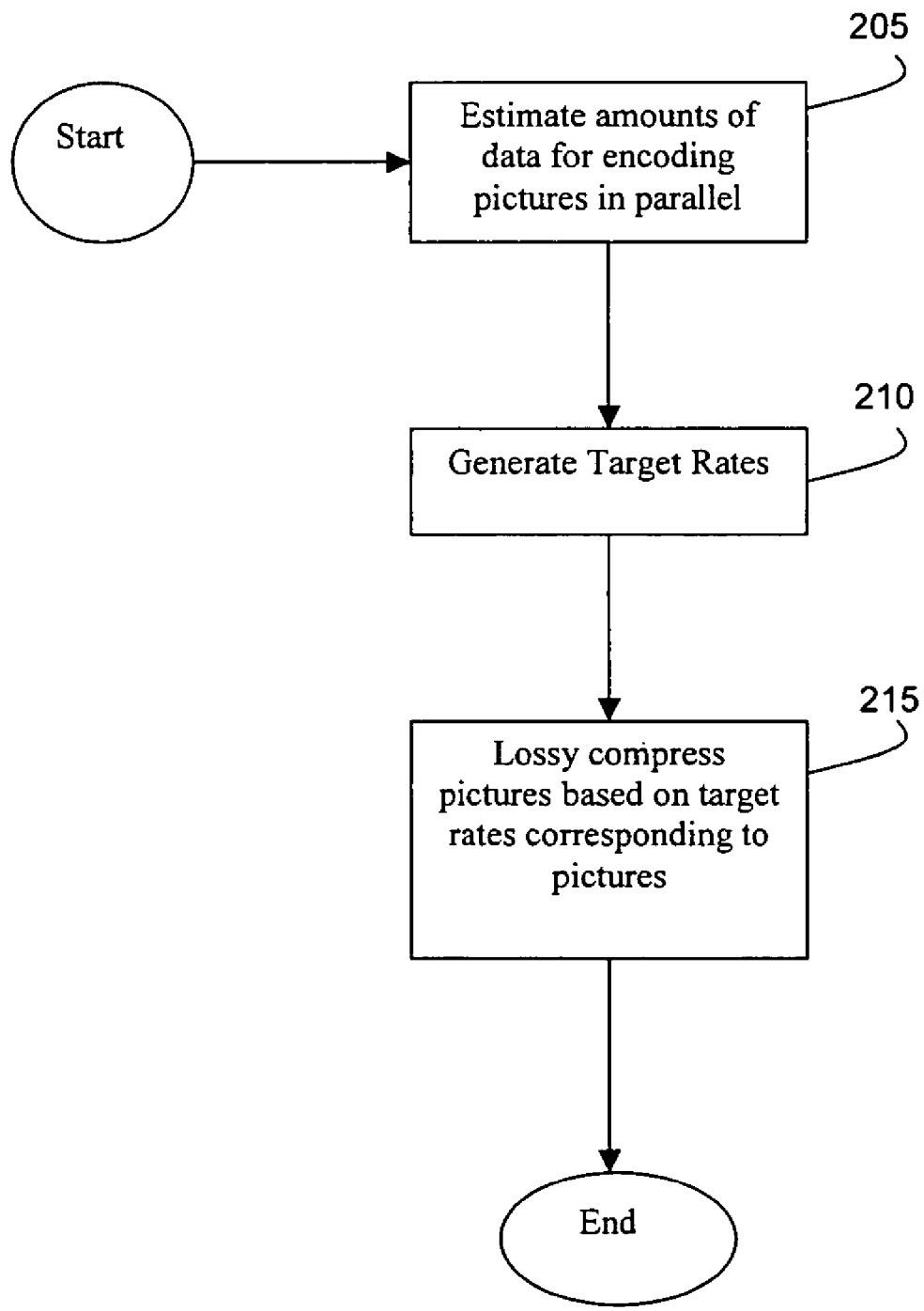
FIG. 2 is a flow diagram for encoding video data in accordance with an embodiment of the present invention.

Referring now to FIG. 2, there is illustrated a flow diagram for encoding video data in accordance with an embodiment of the present invention. At 205, the encoders 110(0) . . . 110(n) each estimates the amounts of data for encoding a first set of pictures 115(0) . . . 115(n) in parallel.

At 210, the master 105 generates target rates for each of the first set of pictures 115(0) . . . 115(n) based on the estimated amounts during 205, while the encoders 110(0) . . . 110(n) estimate the amount of data for encoding a second set of pictures. At 215, the encoders 110(0) . . . 110(n) lossy compress the first group of pictures 115(0) . . . 115(n) based on the target rates corresponding to the plurality of pictures, while the master 105 generates target rates for each of the second set of pictures 115(0) . . . 115(n), and while the encoders 110(0) . . . 110(n) estimates the amounts of data for encoding a third set of pictures 115(0) . . . 115(n).

Embodiments of the present invention will now be presented in the context of an exemplary video encoding standard, Advanced Video Coding (AVC) (also known as MPEG-4, Part 10, and H.264). A brief description of AVC will be presented, followed by embodiments of the present invention in the context of AVC. It is noted, however, that the present invention is by no means limited to AVC and can be applied in the context of a variety of the encoding standards.

Advanced Video Coding

Advanced Video Coding generally provides for the compression of video data by dividing video pictures into fixed size blocks, known as macroblocks 320. The macroblocks 320 can then be further divided into smaller partitions 430 with varying dimensions. The partitions 430 can then be encoded as an offset from reference pixels. Ideally, the partitions 430 are similar to the reference pixels, and therefore, the offsets contain smaller amounts of data. The reference pixels can either comprise pixels from the same picture or a different picture. Where the reference block is from the same picture, the partition 430 is spatially predicted. Where the reference block is from another picture, the partition 430 is temporally predicted.

Spatial Prediction

Figure 3A:
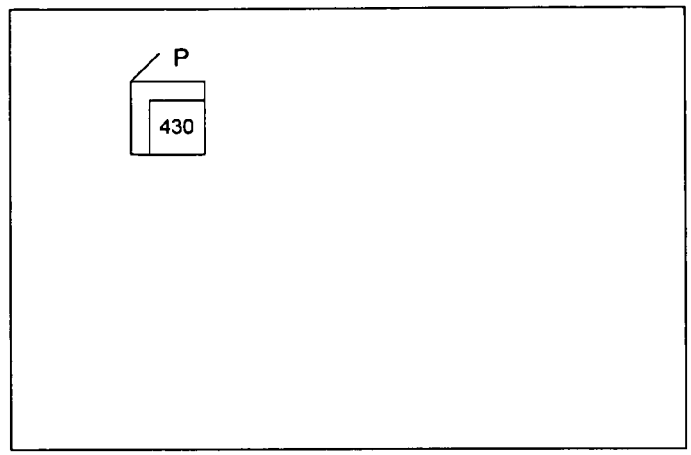
FIG. 3A is a block diagram describing spatial prediction.
Figure 3A:
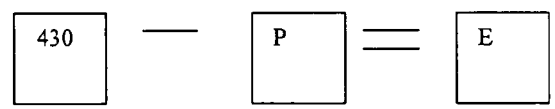

Referring now to FIG. 3A, there is illustrated a block diagram describing spatially encoded macroblocks 320. Spatial prediction, also referred to as intraprediction, is used by H.264 and involves prediction of pixels from neighboring pixels.

The difference between the partition 430 and neighboring pixels P (reference pixels) is known as the prediction error E. The prediction error E is calculated and encoded.

Temporal Prediction

Figure 3B:
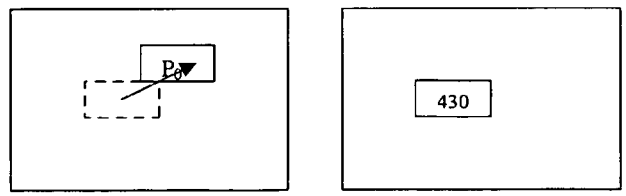
FIG. 3B is a block diagram describing temporally predicted macroblocks.
Figure 3B:
Figure 3B:
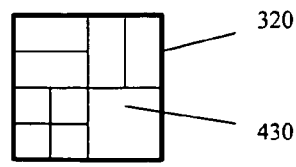

Referring now to FIG. 3B, there is illustrated a block diagram describing temporally prediction. With temporal prediction, partitions 430 are compared to the pixels of other reconstructed frames or fields for a similar block of predicted pixels P. Additionally, the predicted pixels P can be interpolated from pixels in the frame or field, with as much as ¼ pixel resolution in each direction. A macroblock 320 is encoded as the combination of data that specifies the derivation of the reference pixels P and the prediction errors E representing its partitions 430. The process of searching for the similar block of predicted pixels P in pictures is known as motion estimation.

The similar block of pixels is known as the predicted block P. The difference between the block 430 and the predicted block P is known as the prediction error E. The prediction error E is calculated and encoded, along with an identification of the predicted block P. The predicted blocks P are identified by motion vectors MV and the reference frame they came from. Motion vectors MV describe the spatial displacement between the block 430 and the predicted block P.

Transformation, Quantization, and Scanning

Figure 4:
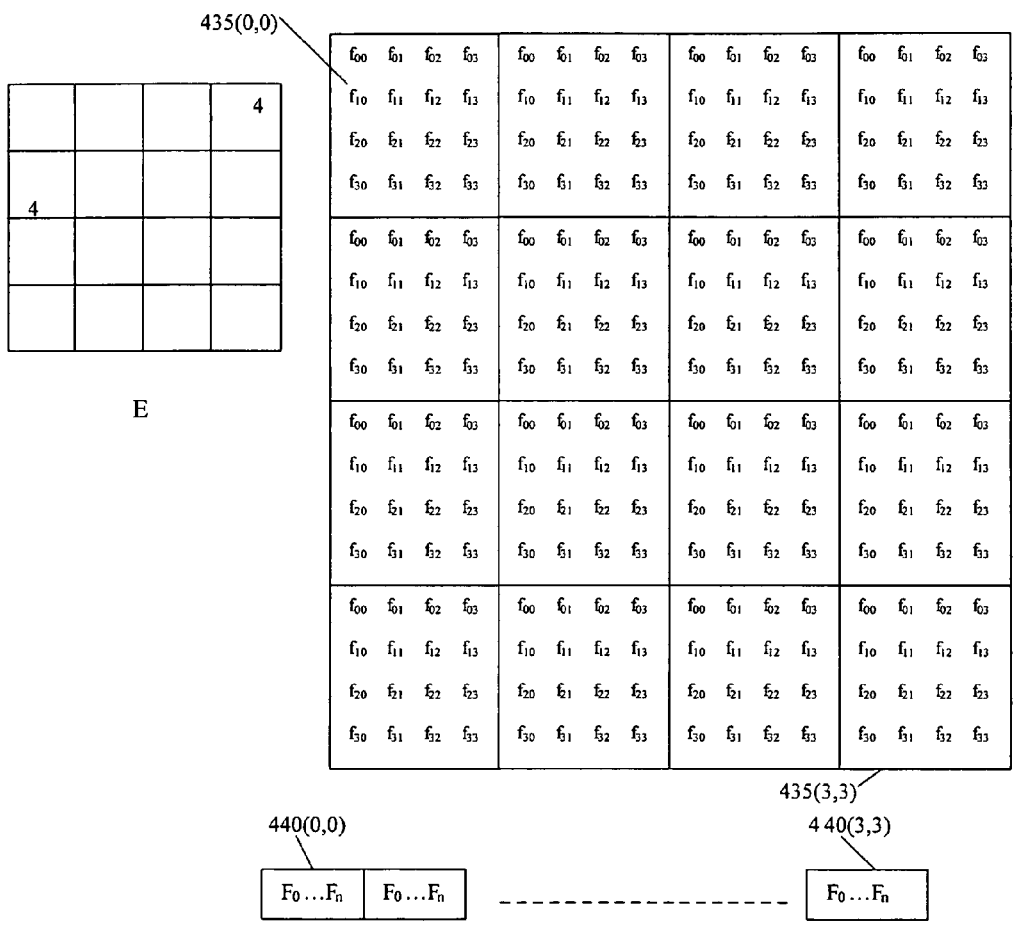
FIG. 4 is a block diagram describing the encoding of a prediction error.

Referring now to FIG. 4, there is illustrated a block diagram describing the encoding of the prediction error E. With both spatial prediction and temporal prediction, the macroblock 320 is represented by a prediction error E. The prediction error E is also two-dimensional grid of pixel values for the luma Y, chroma red Cr, and chroma blue Cb components with the same dimensions as the macroblock 320.

A transformation transforms blocks 430 of the prediction error E to the frequency domain. In H.264, the blocks can be 4×4, or 8×8. The foregoing results in sets of frequency coefficients $f_{00} \ldots f_{mn}$, with the same dimensions as the block size. The sets of frequency coefficients are then quantized, resulting in sets 440 of quantized frequency coefficients, $F_{00} \ldots F_{mn}$.

Quantization is a lossy compression technique where the amount of information that is lost depends on the quantization parameters. The information loss is a tradeoff for greater compression. In general, the greater the information loss, the greater the compression, but, also, the greater the likelihood of perceptual differences between the encoded video data, and the original video data.

The pictures 115 are encoded as the portions 120 forming them. The video sequence is encoded as the frame forming it. The encoded video sequence is known as a video elementary stream. The video elementary stream is a bitstream that can be transmitted over a communication network to a decoder.

Transmission of the video elementary stream instead of the video sequence consumes substantially less bandwidth.

Due to the lossy compression, the quantization of the frequency components, there is a loss of information between the encoded and decoded (reconstructed) pictures 115 and the original pictures 115 of the video data. Ideally, the loss of information does not result in perceptual differences. As noted above, both spatially and temporally encoded pictures are predicted from predicted blocks P of pixels. When the spatially and temporally encoded pictures are decoded and reconstructed, the decoder uses predicted blocks P of pixels from reconstructed pictures. Predicting from predicted blocks of pixels P in original pictures can result in accumulation of information loss between both the reference picture 115 and the picture 115 to be predicted. Accordingly, during spatial and temporal encoding, the encoder uses predicted blocks P of pixels from reconstructed pictures 115.

Motion estimating entirely from reconstructed pictures 115 creates data dependencies between the compression of the predicted picture 115 and the predicted picture 115. This is particularly disadvantageous because exhaustive motion estimation is very computationally intense.

According to certain aspects of the present invention, the process of estimating the amount of data for encoding the pictures 115 can be used to assist and reduce the amount of time for compression of the pictures. This is especially beneficial because the estimations are performed in parallel.

Referring now to FIG. 5, there is illustrated a flow diagram for performing spatial prediction for encoding pictures in accordance with an embodiment of the present invention. The flow diagram will be described in conjunction with FIG. 6. At 505 an original reference picture 605 is scaled down by a factor such as, for example, a scaling factor of 2, to a downscaled picture 610. As a result of downscaling by a factor of 2 the complexity of examining the picture is reduced since the search area is reduced by a factor of 4. At 510 the content of the picture is classified, where the classification indicates the amount of detail in certain areas of the picture, edges, etc. The content classification can vary between different parts of the same picture, and as a result, macroblocks 615 within a picture can have different classifications.

At 515, a spatial estimation mode is selected based on the content classification. At 520, the amount of data for encoding the pictures is estimated based on the mode, and a target rate is generated for each picture, which is based on the estimated amount of data for encoding the picture. At 525, the pictures are encoded using quantization parameters. The quantization parameters are selected based on the target rate for the pictures provided during 520 and the content classification.

At 530, it is determined whether a macroblock 615 is to be encoded using spatial encoding or motion estimation. If the macroblock 615 is to be encoded using spatial encoding, the mode of spatial estimation associated with the macroblock 615 is used in encoding the macroblock at 535. Otherwise, if motion estimation is to be used in encoding the macroblock 615, then motion estimation is performed at 540.

Figure 7:
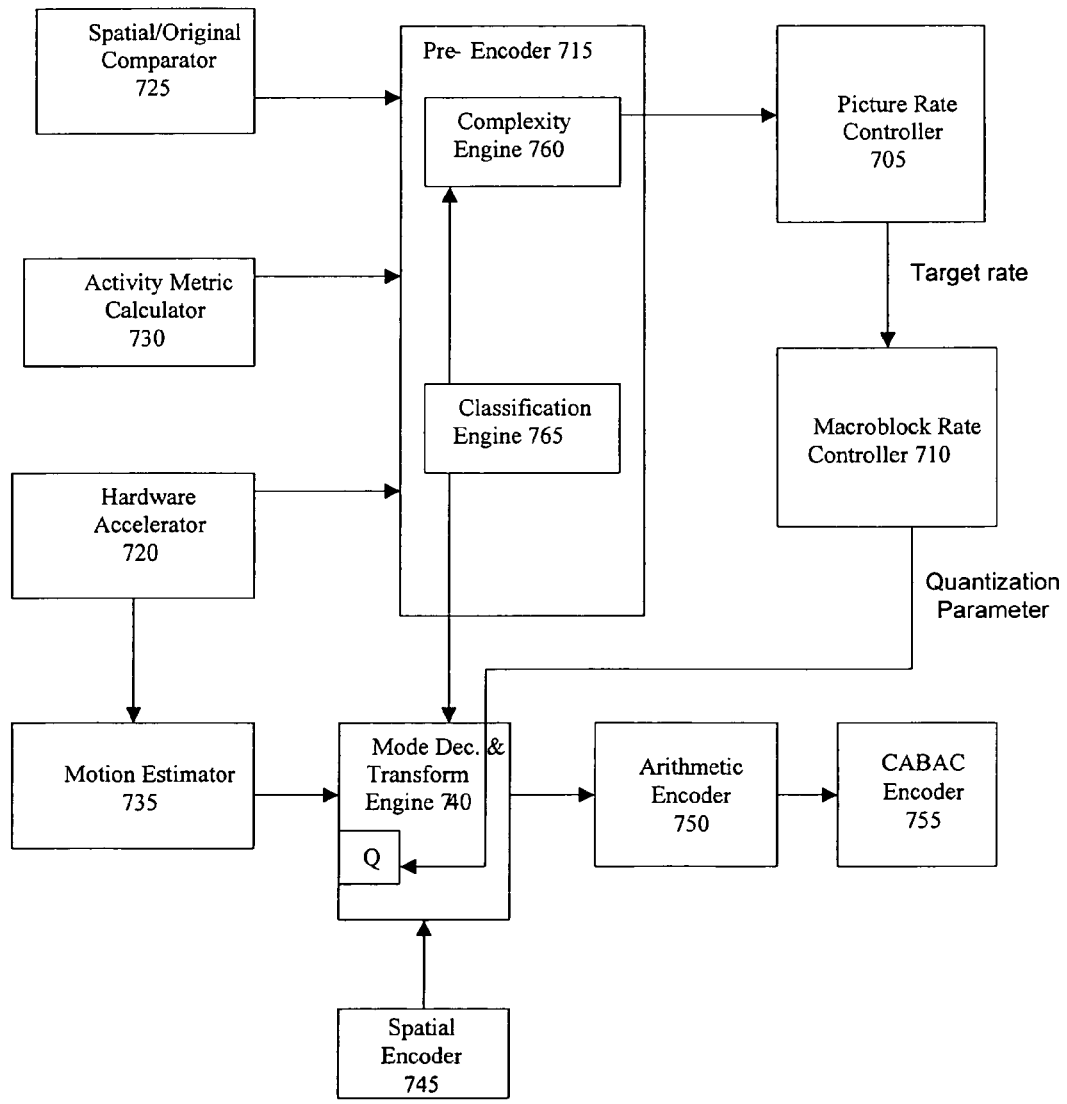
FIG. 7 is a block diagram of a system for encoding video data in accordance with an embodiment of the present invention.

Referring now to FIG. 7, there is illustrated a block diagram of an exemplary system 700 for encoding video data in accordance with an embodiment of the present invention. The system 700 comprises a picture rate controller 705, a macroblock rate controller 710, a pre-encoder 715, hardware accelerator 720, spatial from original comparator 725, an activity metric calculator 730, a motion estimator 735, a mode decision and transform engine 740, an arithmetic encoder 750, and a CABAC encoder 755.

The picture rate controller 705 can comprise software or firmware residing on the master 105. The macroblock rate controller 710, pre-encoder 715, spatial from original comparator 725, mode decision and transform engine 740, spatial predictor 745, arithmetic encoder 750, and CABAC encoder 755 can comprise software or firmware or hardware residing on each of the encoders 110(0) . . . 110(n). The pre-encoder 715 includes a complexity engine 760 and a classification engine 765. The hardware accelerator 720 can either be a central resource accessible by each of the encoders 110, or decentralized hardware at the encoders 110.

The hardware accelerator 720 can search the original reference pictures for candidate blocks CB that are similar to blocks 430 in the pictures 115 and compare the candidate blocks CB to the blocks 430 in the pictures. The pre-encoder 715 estimates the amount of data for encoding pictures 115.

The pre-encoder 715 comprises a complexity engine 760 that estimates the amount of data for encoding the pictures 115, based on the results of the hardware accelerator 720. The pre-encoder 715 also comprises a classification engine 765. The classification engine 765 classifies certain content from the pictures 115 that is perceptually sensitive, such as human faces, where additional data for encoding is desirable.

Where the classification engine 765 classifies certain content from pictures 115 to be perceptually sensitive, the classification engine 765 indicates the foregoing to the complexity engine 760. The complexity engine 760 can adjust the estimate of data for encoding the pictures 115. The complexity engine 765 provides the estimate of the amount of data for encoding the pictures by providing an amount of data for encoding the picture with a nominal quantization parameter Qp. It is noted that the nominal quantization parameter Qp is not necessarily the quantization parameter used for encoding pictures 115.

The spatial from original comparator 725 can utilize the original reference pictures to perform spatial prediction in the pictures 115. The macroblocks of the picture are classified according to content by the classification engine 765 The modes for predicting are then sent to the mode decision and transform engine 740, which estimates the amount of data for encoding a picture using the modes, and based on the estimated amount of data for encoding, a target rate is generated. The mode decision and transform engine 740 then utilizes at least one of quantization parameters to quantize the pictures. The quantization parameter can be selected based on the generated target rate for the pictures, and the classification of the content. The mode decision and transform engine 740 then, based on the results reported by the hardware accelerator 720, determines the best encoding technique to be used for coding macroblocks of the pictures. If it is determined that a macroblock is to be spatially encoded, the mode associated with that macroblock is then used to code the macroblock in the spatial encoder 745.

The picture rate controller 705 provides a target rate to the macroblock rate controller 710. The motion estimator 735 searches the vicinities of areas in the reconstructed reference picture that correspond to the candidate blocks CB, for reference blocks P that are similar to the blocks 430 in the plurality of pictures.

The search for the reference blocks P by the motion estimator 735 can differ from the search by the hardware accelerator 720 in a number of ways. For example, reconstructed reference picture and the picture 115 can be full scale, whereas the hardware accelerator 720 searches the original reference picture and the picture 115 that can be reduced scale. Additionally, the blocks 430 can be smaller partitions of the blocks by the hardware accelerator 720. For example, the hardware accelerator 720 can use a 16×16 block, while the motion estimator 735 divides the 16×16 block into smaller blocks, such as 8×8 or 4×4 blocks. Also, the motion estimator 735 can search the reconstructed reference picture with ¼ pixel resolution.

The spatial predictor 745 performs the spatial predictions for blocks 430. The mode decision & transform engine 740 determines whether to use spatial encoding or temporal encoding, and calculates, transforms, and quantizes the prediction error E from the reference block. The complexity engine 760 indicates the complexity of each macroblock 320 at the macroblock level based on the results from the hardware accelerator 720, while the classification engine 765 indicates whether a particular macroblock contains sensitive content. Based on the foregoing, the complexity engine 760 provides an estimate of the amount of bits that would be required to encode the macroblock 320. The macroblock rate controller 710 determines a quantization parameter and provides the quantization parameter to the mode decision & transform engine 740. The macroblock rate controller 710 can determine the quantization parameter based, at least in part, on complexity. The mode decision & transform engine 740 provides a quantizer Q. The quantizer Q uses the foregoing quantization parameter to quantize the transformed prediction error.

The mode decision & transform engine 740 provides the transformed and quantized prediction error E to the arithmetic encoder 750. Additionally, the arithmetic encoder 750 can provide the actual amount of bits for encoding the transformed and quantized prediction error E to the picture rate controller 705. The arithmetic encoder 750 codes the quantized prediction error E into bins. The CABAC encoder 755 converts the bins to CABAC codes. The actual amount of data for coding the macroblock 320 can also be provided to the picture rate controller 705.

In certain embodiments of the present invention, the picture rate controller 705 can record statistics from previous pictures, such as the target rate given and the actual amount of data encoding the pictures. The picture rate controller 705 can use the foregoing as feedback. For example, if the target rate is consistently exceeded, the picture rate controller 705 can give a lower target rate.

Figure 8:
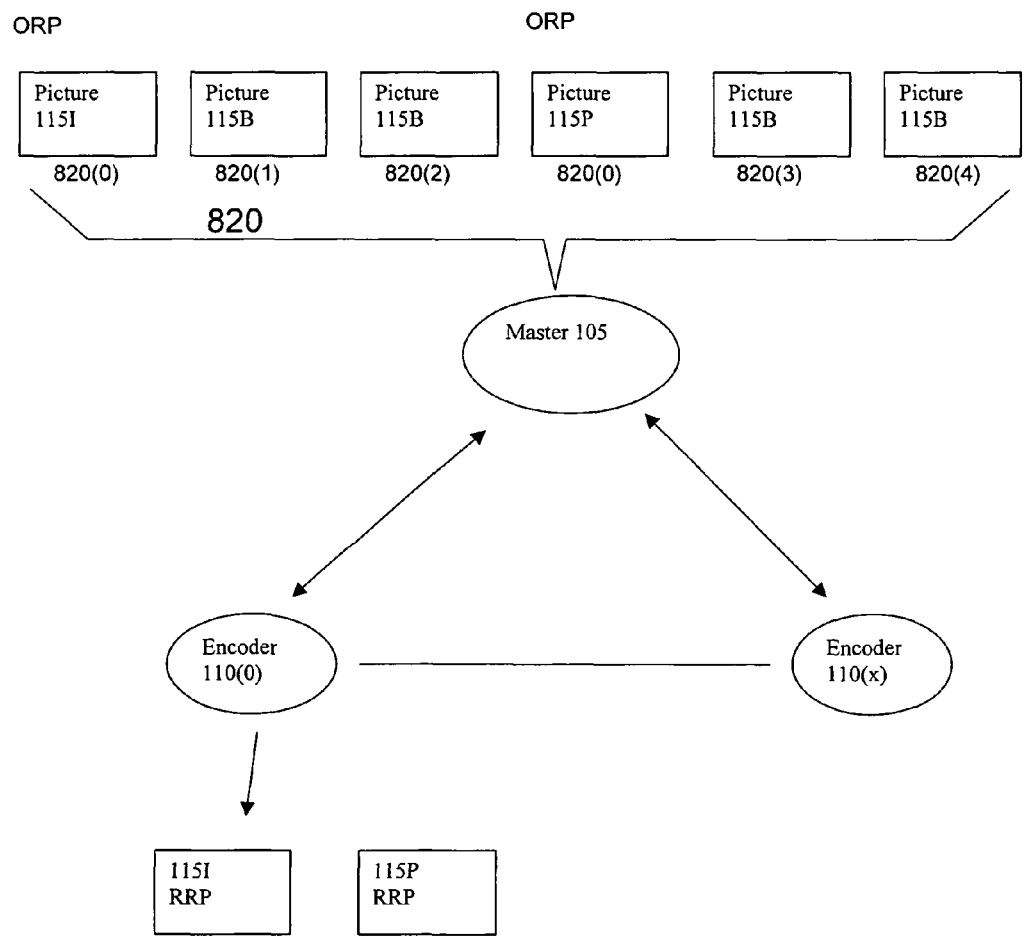
FIG. 8 is a block diagram describing an exemplary distribution of pictures in accordance with an embodiment of the present invention.

Referring now to FIG. 8, there is illustrated a block diagram of an exemplary distribution of pictures by the master 105 to the encoders 110(0) . . . 110(x). The master 105 can divide the pictures 115 into groups 820, and the groups into sub-groups 820(0) . . . 820(n). Certain pictures, intra-coded pictures 115I, are not temporally coded, certain pictures, predicted-pictures 115P, are temporally encoded from temporally earlier reconstructed reference pictures, and certain pictures, bi-directional pictures 115B, are encoded from temporally future and past reference pictures. In general, intra-coded pictures 115I take the least processing power to encode, while bi-directional pictures 115B take the most processing power to encode.

In an exemplary case, the master 105 can designate that the first picture 115 of a group 820 is an intra-coded picture 115I, every third picture, thereafter, is a predicted picture 115P, and that the remaining pictures are bi-directional pictures 115B. Empirical observations have shown that bi-directional pictures 115B take about twice as much processing power as predicted pictures 115P. Accordingly, the master 105 can provide the intra-coded picture 115I, and the predicted pictures 115P to one of the encoders 110, as one sub-group 820(0), and divide the bi-directional pictures 115B among other encoders 110 as four sub-groups 820(1) . . . 820(4).

The encoders 110 can search original reference pictures for candidate blocks that are similar to blocks in the plurality of pictures, and select the candidate blocks based on comparison between the candidate blocks and the blocks in the pictures. The encoders 110 can then search the vicinity of an area in the reconstructed reference picture that corresponds to the area of the candidate blocks in the original reference picture for a reference block.

The embodiments described herein may be implemented as a board level product, as a single chip, application specific integrated circuit (ASIC), or with varying levels of the encoder system integrated with other portions of the system as separate components.

The degree of integration of the encoder system may primarily be determined by the speed and cost considerations. Because of the sophisticated nature of modern processor, it is possible to utilize a commercially available processor, which may be implemented external to an ASIC implementation.

If the processor is available as an ASIC core or logic block, then the commercially available processor can be implemented as part of an ASIC device wherein certain functions can be implemented in firmware. For example, the macroblock rate controller 710, pre-encoder 715, spatial from original comparator 725, activity metric calculator 730, motion estimator 735, mode decision and transform engine 740, arithmetic encoder 750, and CABAC encoder 755 can be implemented as firmware or software under the control of a processing unit in the encoder 110. The picture rate controller 705 can be firmware or software under the control of a processing unit at the master 105. Alternatively, the foregoing can be implemented as hardware accelerator units controlled by the processor.

While the present invention has been described with reference to certain embodiments, it will be understood by those skilled in the art that various changes may be made and equivalents may be substituted without departing from the scope of the present invention.

Additionally, many modifications may be made to adapt a particular situation or material to the teachings of the present invention without departing from its scope. For example, although the invention has been described with a particular emphasis on the AVC encoding standard, the invention can be applied to a video data encoded with a wide variety of standards.

Accordingly, the present invention may be realized in hardware, software, or a combination thereof. The present invention may be realized in a centralized fashion in at least one computer system, or in a distributed fashion where different elements may be spread across several interconnected computer systems. Any kind of computer system or other apparatus adapted for carrying out the methods described herein may be suited. A typical combination of hardware and software may be a general-purpose computer system with a computer program that, when being loaded and executed, may control the computer system such that it carries out the methods described herein.

The present invention may also be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

While the present invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiment disclosed, but that the present invention will include all embodiments falling within the scope of the appended claims.

What is claimed is:

1. A method for encoding video data, the method comprising:
   classifying at least one macroblock of at least one original reference picture with a circuit;
   estimating an amount of data for encoding the at least one macroblock, in parallel, based on the macroblock classification;
   generating a target rate for encoding the at least one macroblock based on the respective estimated amount of data for the at least one macroblock; and
   selecting, based on the target rate or the macroblock classification, at least one quantization parameter for the at least one macroblock of the at least one original reference picture.

2. The method according to claim 1 further comprising encoding a plurality of pictures in parallel.

3. The method according to claim 1 wherein the classification is based on the content of the macroblock.

4. A system for encoding video data, the system comprising:
   a first engine for classifying at least one macroblock of at least one original reference picture;
   a second engine for estimating an amount of data for encoding the at least one macroblock, in parallel, based on the macroblock classification, and for generating a target rate for encoding the at least one macroblock based on the respective estimated amount of data for the at least one macroblock; and
   a quantizer for quantizing the macroblock with a quantization parameter, wherein the quantization parameters is determined at least in part based on the classification of the at least one macroblock.

5. The system according to claim 4 further comprising at least one encoder for encoding a plurality of pictures in parallel.

6. The system according to claim 4 wherein the classification is based on the content of the macroblock.

7. The method according to claim 3 wherein the content includes perceptually sensitive content.

8. The method according to claim 7 wherein the perceptually sensitive content comprises a human face.

9. The method according to claim 1 wherein the classification of the macroblock is based on the amount of detail in the macroblock.

10. The method according to claim 1 further comprising downscaling the at least one original reference picture.

11. The method according to claim 1 wherein the selection of the at least one quantization parameter is based on the target rate and the macroblock classification.

12. The method according to claim 1 further comprising collecting statistics of the target rates and biasing subsequently generated target rates based on the collected statistics.

13. The method according to claim 1 further comprising selecting, based on the classification, an encoding technique for the at least one macroblock.

14. The method according to claim 1 wherein the encoding technique includes motion estimation.

15. The method according to claim 1 wherein the encoding technique includes spatial prediction.

16. A method for encoding video data, the method comprising:
   classifying at least one macroblock of at least one original reference picture, wherein classification of the at least one macro block further comprises indicating an amount of detail in the at least one macroblock, with a circuit;
   estimating an amount of data for encoding the at least one macroblock, in parallel, based on the macroblock classification;
   selecting, based on the macroblock classification, at least one quantization parameter for the at least one macroblock of the at least one original reference picture; and
   selecting an encoding technique for the at least one macroblock based on the amount of detail in the at least one macroblock, wherein the encoding technique is one of spatial prediction or motion estimation.

17. The method according to claim 16 further comprising encoding a plurality of pictures in parallel.

18. The method according to claim 16 further comprising downscaling the at least one original reference picture.

19. The method according to claim 16 wherein the selection of the at least one quantization parameter is based on the target rate and the macroblock classification.

20. The method according to claim 16 wherein the encoding technique is spatial prediction.

* * * * *